(12) United States Patent
Babcock (10) Patent No.: US 6,252,607 B1
(45) Date of Patent: Jun. 26, 2001

(54) METHOD AND SYSTEM FOR CHARACTER SPACING IN GRAPHICS TERMINAL EMULATION

(75) Inventor: Scott E. Babcock, Kirkland, WA (US)

(73) Assignee: Attachmate Corporation, Bellevue, WA (US)

( * ) Notice: Subject to any disclaimer, the term of this patent is extended or adjusted under 35 U.S.C. 154(b) by 0 days.

(21) Appl. No.: 09/123,910

(22) Filed: Jul. 27, 1998

(51) Int. Cl.[7] ................................................. G06T 9/00
(52) U.S. Cl. ....................... 345/468; 345/469; 345/127; 345/128; 345/129; 345/130
(58) Field of Search ................................... 345/468, 467, 345/469, 144, 472, 439, 471, 470, 127, 128, 129, 130

(56) References Cited

U.S. PATENT DOCUMENTS

| | | | | |
|---|---|---|---|---|
| 4,323,892 | * | 4/1982 | Kinghorn | 340/724 |
| 5,001,697 | * | 3/1991 | Torres | 364/521 |
| 5,367,578 | * | 11/1994 | Golem et al. | 382/12 |
| 5,579,416 | * | 11/1996 | Shibuya et al. | 382/293 |
| 5,754,873 | * | 5/1998 | Nolan | 395/789 |
| 5,790,126 | * | 8/1998 | Ballard et al. | 345/468 |
| 6,043,802 | * | 3/2000 | Gormish | 345/127 |

* cited by examiner

Primary Examiner—Matthew Luu
Assistant Examiner—Daniel J Chung
(74) Attorney, Agent, or Firm—Seed IP Law Group PLLC (57) ABSTRACT

A method and system are provided for positioning characters within an arbitrarily sized graphics window in order to maximize the distribution of unused space. The method and system are particularly adapted for the redistribution of characters produced during a terminal emulation session with another computing system. Characters produced during the emulated session are adjusted to completely fill the graphics window, regardless of its size. A fill justification procedure distributes characters in areas within the graphics window that would otherwise appear as gutters or margins. A character spacing unit maintains correct character image proportions in the graphics window while not rigidly adhering to a uniform alignment of character rows and columns. A linear distribution procedure allows the character image to fill the graphics window completely with a natural appearance.

9 Claims, 9 Drawing Sheets

METHOD AND SYSTEM FOR CHARACTER SPACING IN GRAPHICS TERMINAL EMULATION

TECHNICAL FIELD

The present invention relates to computer programming and, in particular, to a method and system for matching the dimensions of the text layer of a graphics terminal emulation session with those of the graphics layer of the same session, allowing images transmitted by a host computing system to be scaled while retaining correct proportions.

BACKGROUND OF THE INVENTION

A terminal emulator allows an intelligent computing device such as a personal computer ("PC") to mimic or emulate a fixed-function terminal's communications with a mainframe host computer or a host minicomputer. As its name implies, a fixed-function terminal may perform only a limited set of specific tasks related to the display and manipulation of mainframe or minicomputer data. Terminal emulation software makes a general-purpose computing device such as a Windows PC appear to the host computer as a particular type of terminal with which the host may communicate using its native data stream. For example, IBM computers may communicate with 3270 terminals in an IBM System Network Architecture ("SNA") network. In an emulation environment, the host computer exchanges data and commands with the client in accordance with the appropriate characteristics of the emulated terminal.

Thus, a typical terminal emulator receives and sends data and commands appropriate to a particular terminal. For example, character mode terminals, also known as text mode terminals or alphanumeric mode terminals, display letters, numbers, and other text characters but not graphical images or WYSIWYG ("what-you-see-is-what-you-get") character formatting, such as proportional spacing, italics and superscript. Many graphics terminals, such as the IBM 3000 series, display text in fixed matrices of uniform columns and rows. For example, the two standard matrices (columns by rows) supported by the IBM 3179G, 3192G and 3472G graphics terminals are respectively 80-by-24 (Model 2) and 80-by-32 (Model 3), with each matrix display coordinate expressed in terms of a specific column and row. A character cell located at each matrix display coordinate is a rectangular block of pixels that represents the space in which a given character is drawn on the screen.

Emulation systems have been developed that emulate fixed-function terminals on more modern PC-based computing systems and provide an interface with the host applications. Many of these emulation systems display the data produced from the host session in a graphical format on the PC. The PC's graphical display may be produced within "windows" by a graphical user interface ("GUI") program. A GUI window typically has greater flexibility in its display than a fixed-function terminal. Accordingly, the display of an emulated terminal session typically does not have the rich characteristics of other more common GUI-based application programs. Emulation of graphics terminals such as the IBM 3472G is potentially the most restrictive in a GUI environment because the mainframe graphics application scales graphical data according to display characteristics reported by the emulator at the beginning of the session. The emulator must reconcile differences between the reported characteristics and the actual physical characteristics of the PC's display subsystem.

Figure 1:
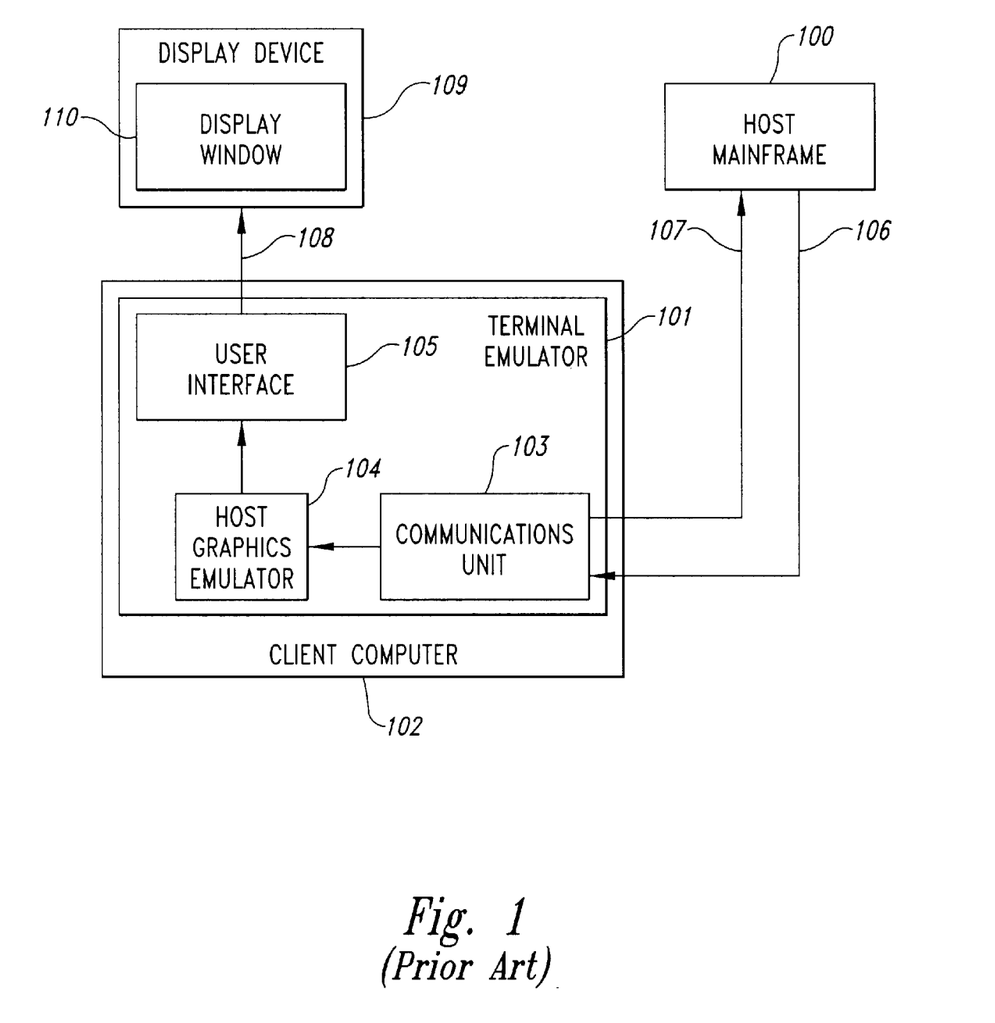
FIG. 1 illustrates a conventional terminal emulation environment.

FIG. 1 illustrates a conventional mainframe graphics terminal emulation environment. A host mainframe computer 100 communicates with a client computer 102 through a terminal emulator 101. A communications unit 103 in the terminal emulator 101 sends data 107 to the host mainframe 100. The host mainframe 100 returns data 106 to the communications unit 103. Some of the data returned by the host mainframe 100 to the communications unit 103 includes graphical data which the communications unit 103 forwards to a host graphics emulator 104. The host graphics emulator performs some formatting of the emulation session data before forwarding this data to a user interface 105 suitable for producing display data in a format required by the client computer 102. The user interface 105 provides the display data 108 to a display device 109 which then depicts a graphics display window 110 that contains the emulated session data.

Figure 2A:
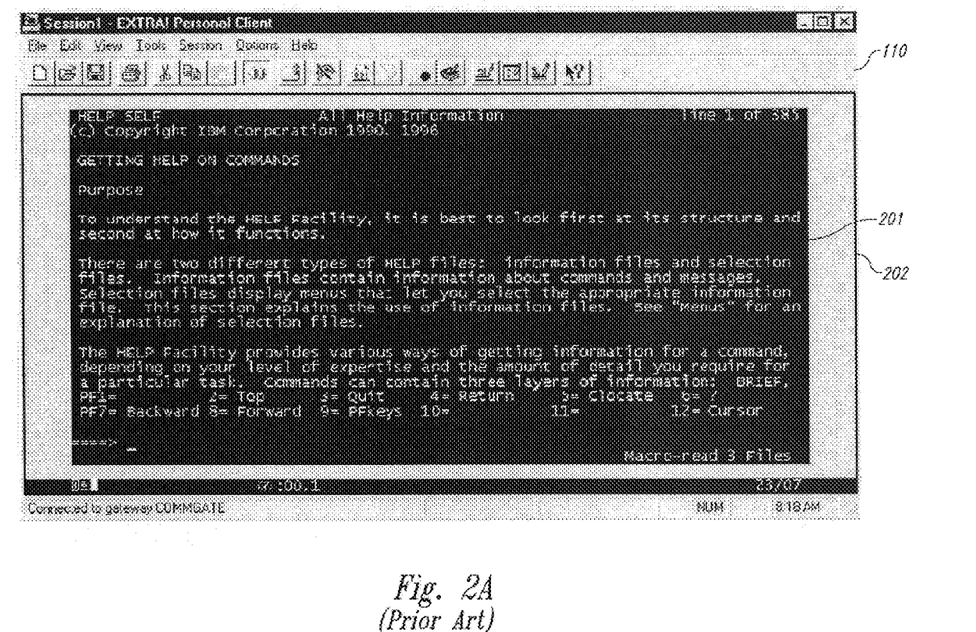
FIG. 2A illustrates a conventional text-mode display session as depicted within a graphics display window generated by a personal computer ("PC").

FIG. 2A illustrates a conventional text-mode emulation display session as depicted within the graphics display window 110. The display device 109 displays an emulated session 201 within a graphics border 202 of the graphics display window 110. Because the host mainframe 100 produces the emulated session 201, according to its predetermined format, and the client computer 102 produces the graphics border 202 according to the characteristics of the display device 110, the emulated session data 201 may not necessarily align with the graphics border 202. For example, as shown in FIG. 2A, a great deal of unused space exists between the graphics border 202 and the emulation session data 201. Many emulation system customers would prefer terminal emulation session displays that utilize more of the available area within the GUI window than that shown in FIG. 2A.

Figure 2B:
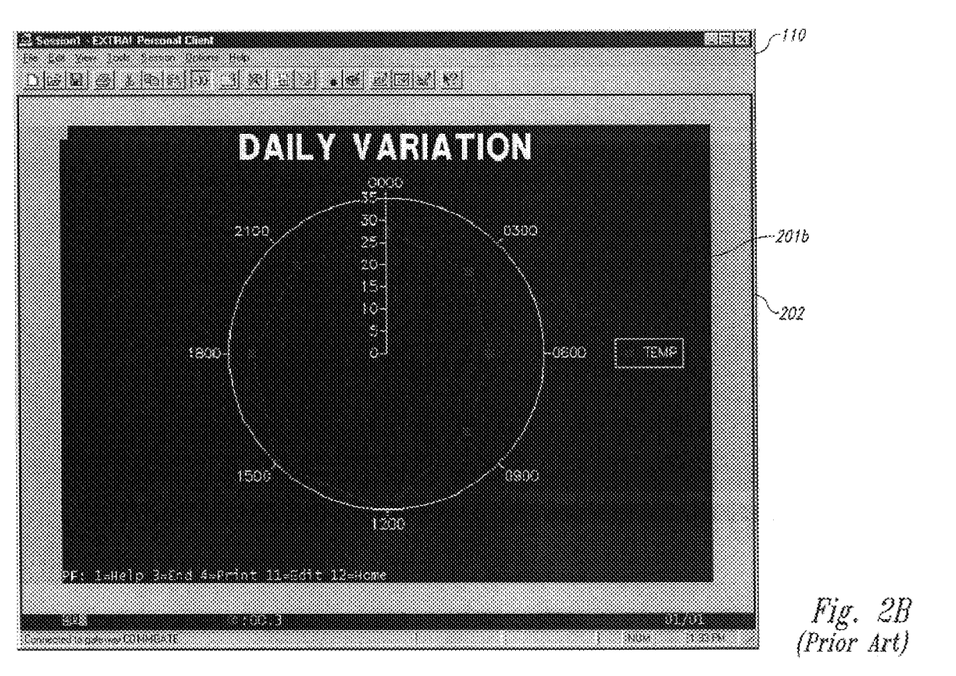
FIG. 2B illustrates a conventional graphics-mode emulation display session as depicted within a graphics display window generated by a PC.

FIG. 2B illustrates a conventional graphics-mode emulation display session as depicted within the graphics display window 110. The display device 109 displays an emulated session 201b within the graphics border 202 of the graphics display window 110. Because the host mainframe 100 produces the emulated session 201b, according to its predetermined format, and the client computer 102 produces the graphics border 202 according to the characteristics of the display device 110, the emulated session 201b may not necessarily align with the graphics border 202. For example, as shown in FIG. 2B, a great deal of unused space exists between the graphics border 202 and the emulation session 201b. Many emulation system customers would prefer terminal emulation session displays that utilize more of the available area within the GUI window than that shown in FIG. 2B.

SUMMARY OF THE INVENTION

Embodiments of the present invention provide a method and system for displaying in real time emulated characters produced by a host computing system in an arbitrarily sized graphics display window controlled by a client computing system. Displayed characters minimize the unused graphical user interface ("GUI") window space while still maintaining an appropriate aspect ratio for mainframe graphics images.

The mainframe graphics emulator adjusts the dimensions of the graphics layer to minimize unused GUI window space while maintaining correct aspect ratio. A character spacing unit invokes a font-sizing procedure that scales the emulated characters in a manner appropriate for the dimensions of the graphics layer, according to an embodiment of the invention. The character spacing unit centers the character text within the bounds of the graphics layer. The character spacing unit next synthesizes additional font sizes by adding pixels to the width and/or height of the basic character cell dimensions in order to further enlarge the characters and decrease the unused area within the bounds of the graphics layer without varying the emulated characters' spacing. Finally, the character spacing unit distributes any remaining area within the bounds of the graphics layer throughout the rows and columns of text using a linear distribution procedure. The linear distribution procedure allows the character image to occupy the graphics display window with a natural appearance. The character spacing unit uses the linear distribution procedure to distribute characters both horizontally and vertically in the graphics display window generated by the client computer. The character spacing unit enables the graphics emulator to scale images, maintaining correct aspect ratio, while not rigidly adhering to a uniform spacing of character rows and columns.

According to a method of the invention, emulated characters are scaled in a manner appropriate for the size of the graphics display window. The scaled character text is then centered within the graphics display window. Additional font sizes are then synthesized by adding pixels to the width and/or height of the basic character cell dimensions in order to utilize a larger area within the graphics display window without varying the character spacing. Any remaining area within the graphics display window is then distributed throughout the rows and columns of text using a linear distribution procedure. The Bresenham line drawing algorithm serves as the linear distribution procedure, according to an embodiment of the invention.

BRIEF DESCRIPTION OF THE DRAWINGS

An exemplary embodiment of the present invention will be described below relative to the following figures. Note that similar elements and steps in the figures have the same reference number.

DETAILED DESCRIPTION OF THE INVENTION

The invention provides a method and system for positioning characters within an arbitrarily sized graphics window displaying in real time a terminal emulation session generated by another computing system. The invention enables the characters produced during the emulation session to maximize the display within the graphics window, regardless of its size. A character spacing unit performs a fill justification procedure that enlarges the characters and distributes them into areas within the graphics window that would otherwise appear as gutters or margins. The character spacing unit further enables the graphics emulator to scale images, maintaining correct aspect ratio, while not rigidly adhering to a uniform spacing of character rows and columns.

According to a method of the invention, the character spacing unit scales emulated characters in a manner appropriate for the size of the graphics display window. The character spacing unit then centers the scaled character text within the graphics display window. The character spacing unit next synthesizes additional font sizes by adding pixels to the width and/or height of the basic character cell dimensions in order to utilize a larger area within the graphics display window without varying the character spacing. Finally, the character spacing unit distributes any remaining area within the graphics display window throughout the rows and columns of character text using a linear distribution procedure. The linear distribution procedure allows the character text to occupy the graphics display window with a natural appearance. The character spacing unit uses the linear distribution procedure to distribute characters both horizontally and vertically in the graphics display window.

Figure 3:
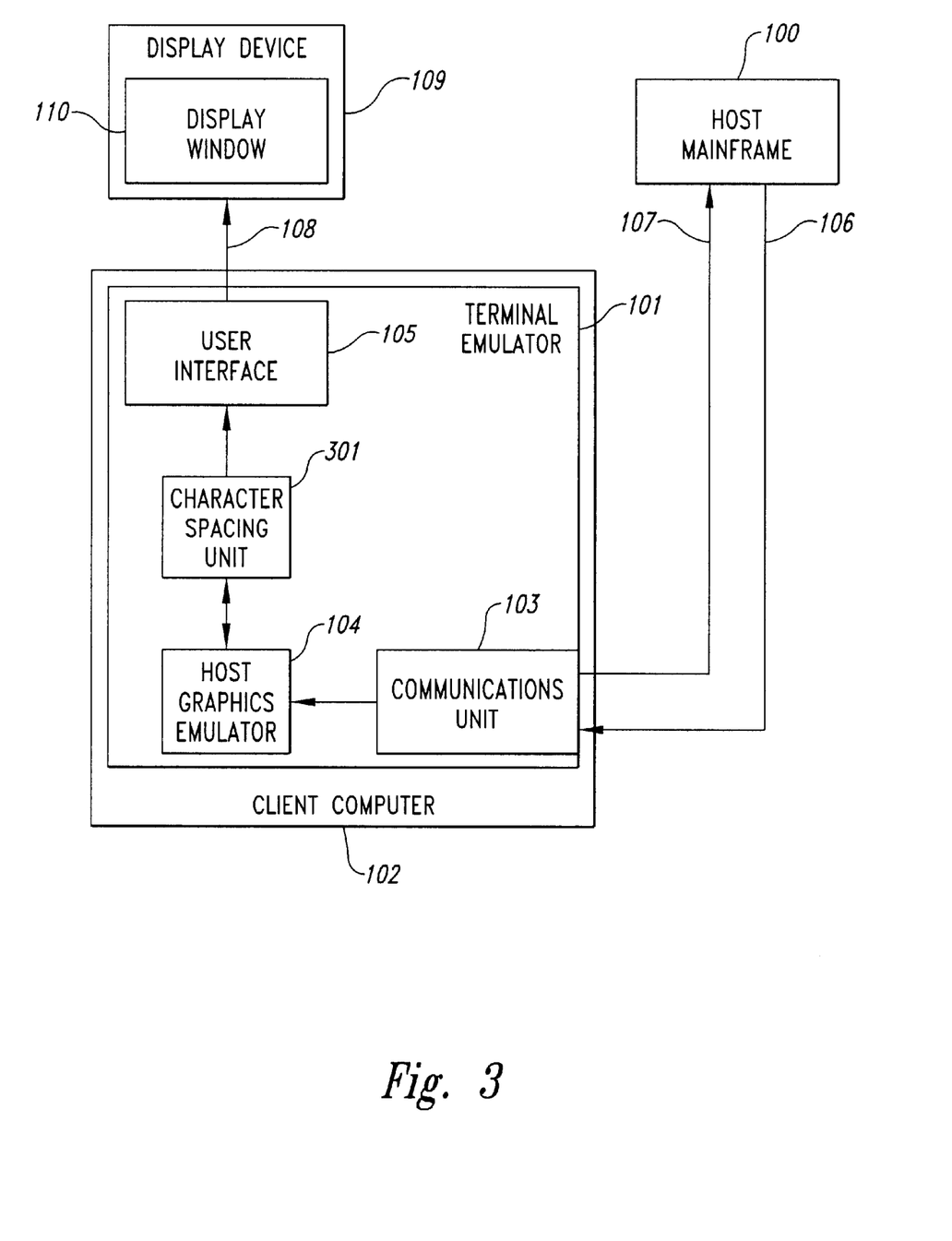
FIG. 3 illustrates the character spacing unit associated with an exemplary embodiment of the present invention.

A character spacing unit associated with an exemplary embodiment of the present invention is illustrated in FIG. 3. A character spacing unit 301 receives graphical output data from the host graphics emulator 104. The character spacing unit 301 performs the fill justification procedure on the received data to distribute otherwise unused space in the graphical data received. Once the character spacing unit 301 has completed performance of the fill justification procedure, the character spacing unit 301 provides the reformatted character data to the user interface 105 for display in the graphics display window 110.

In graphics mode emulation sessions, the character spacing unit 301 enables the host graphics emulator 104 to maintain correct image proportions for mainframe graphics images produced during an emulation session with the host mainframe 100 while still providing a large degree of freedom relative to the dimensions of the emulation session graphics layer. Without the character-positioning capabilities provided by the character spacing unit 301, the dimensions of the emulation session graphics layer that would be necessary for maintaining correct image proportions for mainframe graphics images would be restricted to one size for each type of emulated terminal. In other words, the emulation session display would lose its dimensional flexibility, with control over the size of the emulation session display essentially passing to the host mainframe 100.

When emulating the behavior of an existing graphics terminal, such a session produced by an IBM 3270 terminal, the terminal emulator should maintain correct proportions for the emulated graphics. Maintaining correct proportions allows the image produced by the terminal emulator to retain the visual characteristics of the original image produced by the graphics device being emulated. Two general approaches may be utilized to maintain correct image proportions.

In the first approach, the approach used by most graphics terminal emulators, the terminal emulator selects character cell dimensions that yield the correct proportions when grouped together in fixed rows and columns. The first method is very limiting in that the terminal emulator cannot scale the image to fit various graphics display window sizes and screen resolutions.

In the second approach, the approach used by the present invention, the terminal emulator selects overall display dimensions and then fits the rows and columns of text within those dimensions. The second method provides a great deal of flexibility with regard to image scaling. However, employment of this method requires the ability to distribute the character text to match the desired overall dimensions. An exemplary technique for distributing the character text to match the desired dimensions will be described below.

The display of a graphics terminal is logically comprised of two distinct coincident layers: a text layer in the foreground and a graphics layer in the background. Many screen-based host applications run on large to medium-size computing systems, such as IBM mainframes, IBM AS/400s, Unisys computers, and Digital VAX computing systems. Applications for such computing systems have often been designed for use with text mode display terminals and are based on individual screens. Text mode terminals, also known as character mode terminals or alphanumeric mode terminals, display letters, numbers, and other text characters but not graphical images. In contrast, other mainframe host applications may operate with a graphics mode terminals. In addition to letters, numbers and other text characters, a graphics mode terminal allows for the display of graphical image data.

In emulating a graphics mode terminal on another computing system, such a personal computer ("PC") having a graphical user interface ("GUI"), the emulator must account for differences between the emulation environment and the device being emulated. For example, emulating an IBM graphics terminal entails reporting physical characteristics to mainframe applications just as each actual terminal device would and then reconciling differences between these reported characteristics and the actual physical characteristics of the display subsystem through coordinate transformations.

Conventional emulation methods often entail reporting the actual physical characteristics of the emulator's display in the hope that host mainframe graphics applications will recognize the emulator's "non-standard" characteristics (for a host terminal) and adjust their behavior accordingly. In a conventional terminal emulator, one using the first approach described above, the graphics emulator adjusts the text layer first and then adjusts the graphics layer.

In contrast, the present invention reverses this order of processing, adjusting the graphics layer first and then the text layer. This procedure maximizes the area occupied by the emulated session in the graphics display window. Thus, the present invention does not rigidly enforce the uniformity of character spacing practiced by the conventional approach. The invention operates counter-intuitively to the conventional emulation paradigm in which the text in the graphics display window is rigidly matched to the fixed rows and columns of text produced by the emulated session. Because of the steps preceding the final distribution of excess space in the graphics display window 110, any non-uniformities provided by the present invention are minor, however, and generally undetectable by an observer. Thus, the present invention performs the distribution of extra pixels in a manner that both fills the graphics display window and provides a superior display.

Figure 4:
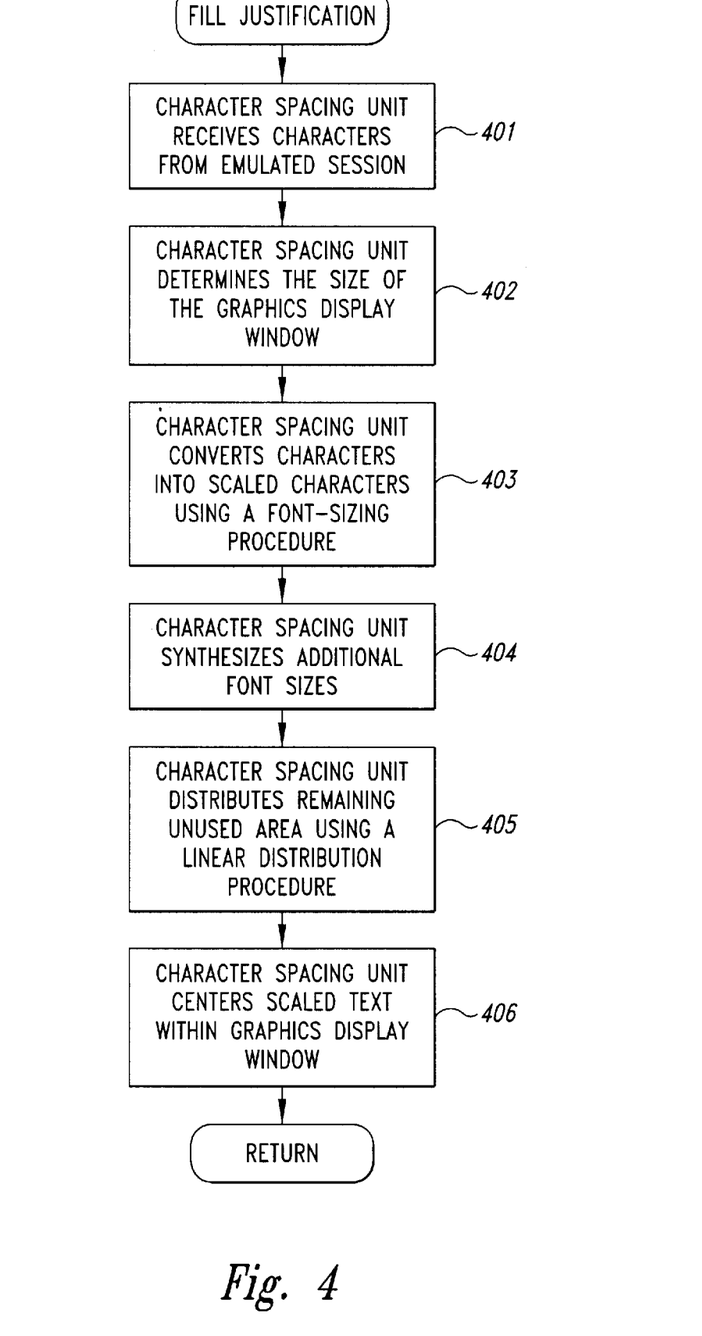
FIG. 4 is a flowchart illustrating the steps performed during the fill justification procedure, according to the exemplary embodiment of the invention.

A flowchart is shown in FIG. 4 illustrating the steps performed to maximize the space filled by the emulated characters in the graphics display window, according to an exemplary embodiment of the invention. Text produced by an emulation session may be scaled to fill an arbitrarily sized graphics window by the following procedure, according to an embodiment of the invention.

The character spacing unit 301 receives characters from an emulated session ("step 401"). The character spacing unit 301 determines the size of the graphics display window 110 ("step 402"). The character spacing unit 301 may utilize any available font-sizing capabilities provided by the client computer 102. For example, the character spacing unit 301 may utilize the font-sizing capabilities provided by the well-known TrueType fonts available on the Windows operating system ("Windows"). Other font-sizing systems would be equally applicable. Thus, the character spacing unit 301 may invoke the conversion of the characters received from the emulation session into scaled characters ("step 403").

The well-known TrueType fonts use straight lines and curves to define the outline of each character. Because these lines and curves are based on an arbitrary coordinate system, simply scaling their coordinates also scales their representative TrueType character. When a program invokes a TrueType font of a particular size, Windows "rasterizes" the font by scaling the coordinates connecting the lines and curves of each character using "hints" that are included in the TrueType font file. The hints compensate for rounding errors that would otherwise render a resultant character unsightly.

In step 403, the character spacing unit 301 may utilize the scaleable nature of TrueType fonts to determine the optimum font size for displaying the received character text in the graphics display window 110 and then explicitly requests that font size from Windows. The character spacing unit 301 matches the sizes and alignments of the character fonts provided by the host mainframe 100 and produces scaled characters. The character spacing unit 301 also compensates for any disparity between the font size requested and the font size obtained, altering the requested size to produce a scaled text whose character size is equal to or smaller than the desired size.

The character spacing unit 301 next synthesizes additional sizes of fonts by adding pixels to the width and/or height of basic character cell dimensions ("step 404"). This step enlarges the area occupied by the characters within the graphics display window 110 without varying character spacing. Synthesizing additional font sizes is necessary because the TrueType font scaling described above provides character sizes equal to or smaller than the desired size. In other words, the scaled fonts provided in step 403 will fill the graphics display window 110 more completely than the originally received characters but additional unused space may still remain, especially since the TrueType font scaling will not violate the alignment of characters in fixed rows and columns. An embodiment of the font synthesis procedure is described more fully below.

The character spacing unit 301 distributes any remaining area within the graphics display window 110 throughout the rows and columns of text using a linear distribution procedure ("step 405"). Thus, rows and columns within the displayed characters are not necessarily uniform. However, by the time the character spacing unit 301 distributes the unused space within the graphics display window, the unused space has already been considerably reduced by the preceding steps. An embodiment of the linear distribution procedure is described more fully below.

Finally, the character spacing unit 301 centers the scaled text within the graphics display window ("step 406"). This step reduces the visual impact of the previously unused area in the graphics display window, such as margins and gutters, and splits the unused area into smaller pieces.

The character spacing unit 301 now sends the resulting character text to the user interface 105 for display in real time on the graphics display window 110. The real time display closely matches the human user's perception of time with regard to operations while directly using the host computer. The real time display allows terminal emulation and display on the client computer to proceed at a perceptively similar rate as direct operations on the client computer. The displayed character text minimizes the otherwise unused space within the graphics display window 110, providing the user with a scaled image having an appropriate size for the dimensions of the graphics display window 110.

The following provides additional detail for an exemplary font-sizing synthesis procedure suitable for use as the font-sizing synthesis step 405 described above. The exemplary font-sizing synthesis step adds pixels to the width and/or height of each character cell according to the following formulae:

width modifier=(window width÷text columns)−base width height modifier=(window height÷text rows)−base height where base height and base width are the basic unmodified character cell dimensions of the font. Window height and window width are the height and width of the graphics display window 110 and text columns and text rows are the columns and rows for the character text received in the emulation session from the host mainframe 100. All calculations are performed as integer operations, discarding any fractional components, according to this embodiment.

The exemplary font-sizing synthesis step produces synthesized cell dimensions that can be expressed as follows:

synthesized width=window width÷text columns synthesized height=window height÷text rows All calculations are again performed as integer operations, discarding any fractional components, according to this embodiment.

An exemplary linear distribution procedure for use with the linear distribution step 406 shown in FIG. 4 will now be described. The exemplary linear distribution procedure operates as an extension of the font synthesis step 405, essentially preserving the fractional components of the calculations used in he font synthesis step 405.

The rigid alignment of the character text rows and columns leaves any unused space in the graphics display window 110 at its margins. The exemplary linear distribution procedure begins by determining the extent of the unused marginal portions in the graphics display window 110 as calculated by the following formulae:

margin width=window width−(synthesized width×text columns)

margin height=window height−(synthesized height×text rows)

This unused portion is then distributed through the rows and columns of text using a linear distribution algorithm. A linear distribution algorithm ensures a linear distribution of any remaining unused space to minimize its appearance.

The conventional Bresenham line drawing algorithm may be utilized as the linear distribution algorithm, according to an embodiment of the invention. The Bresenham line drawing algorithm is normally applied to raster graphics devices for drawing straight lines and not to distribute unused pixels in a character display subsystem, such as the graphics display window 110, as used in the present invention. To represent a line in a raster-display system, the display system must employ an algorithm that determines which set of x and y coordinates for pixels most closely approximates the line. In complex displays, the algorithm may be invoked hundreds or even thousands of times each time an image is created or modified, so the algorithm must be extremely fast to be useful in interactive environments. This precludes the use of slow operations such as multiplication (except integer multiplication by 2), division and all floating-point arithmetic. Accordingly, the Bresenham algorithm operates only with integers and performs faster than an algorithm that operates using the fractions produced by floating point mathematics.

The Bresenham algorithm is not normally applied to character display subsystems such as those used in present invention. The Bresenham algorithm is applied in the present invention to distribute extra pixels in both the horizontal and vertical dimensions of the graphics display window 110.

Table 1 below provides pseudocode illustrating an exemplary embodiment of the Bresenham line drawing algorithm. In the present application of the Bresenham algorithm, the line represents either the horizontal length or vertical length of the graphics display window 110. As shown in Table 1, the Bresenham line drawing algorithm receives the beginning point (X1, Y1) and ending point (X2, Y2) for a line. As previously discussed, the Bresenham line-drawing algorithm operates using integer calculations.

Bresenham's line-drawing algorithm derives from the basic line equation, Y=mX+b, where "m" is the slope of the line ($\Delta Y \div \Delta X$) and "b" is the point at which the line intersects the X axis. The intersection point "b" is not necessary in this application and is ignored. Valid input for the basic algorithm in defined as follows: $\Delta X \geq \Delta Y \geq 0$. Because of this restriction, the slope of the line will have the range $1 \geq slope \geq 0$.

Fractions are eliminated from the basic line equation and rounding is enables through multiplication by $2\Delta X$. The test variable ("Testvar") is an error term which is initialized to a value that can be expressed as $2\Delta X(slope-\frac{1}{2})$. The slope variable ("a") can be expressed as $2\Delta X(slope)$. The normalization variable ("b") can be expressed as $2\Delta X(slope-1)$.

Following the initial calculations, the Bresenham algorithm utilizes a "For" loop that steps through the line's horizontal distance ("the X coordinate"), using the test variable to determine if the vertical distance ("the Y coordinate") will increase at that X coordinate. The WritePixel function outputs the line's coordinates at a given point before incrementing the x variable and returning to the "For" loop.

TABLE 1

| 1 | Bresenham Line Drawing Algorithm (x1, y1, x2, y2) |
|---|---|
| 2 | Int Variable Testvar, a, b, x, y; |
| 3 | |
| 4 | { |
| 5 | /* Line endpoints are (x1, y1) and (x2, y2) */ |
| 6 | |
| 7 | Testvar = 2 * ((y2 − y1)) − (x2 − x1)); |
| 8 | a = 2 * (y2 − y1); |
| 9 | b = 2 * ((y2 − y1) − (x2 − x1)); |
| 10 | |
| 11 | y = y1; |
| 12 | |
| 13 | For (x = (x1 + 1) to (x2 − 1)) |
| 14 | { |
| 15 | if (Testvar < 0) |
| 16 | { |
| 17 | then |

TABLE 1-continued

```
18              {
19                  Testvar = Testvar + a;
20              }
21          else
22              {
23                  Testvar = Testvar + b;
24                  y = y + 1;
25              }
26          }
27          WritePixel (x, y);
28          x++;
29      }
30  }
```

Figure 5:
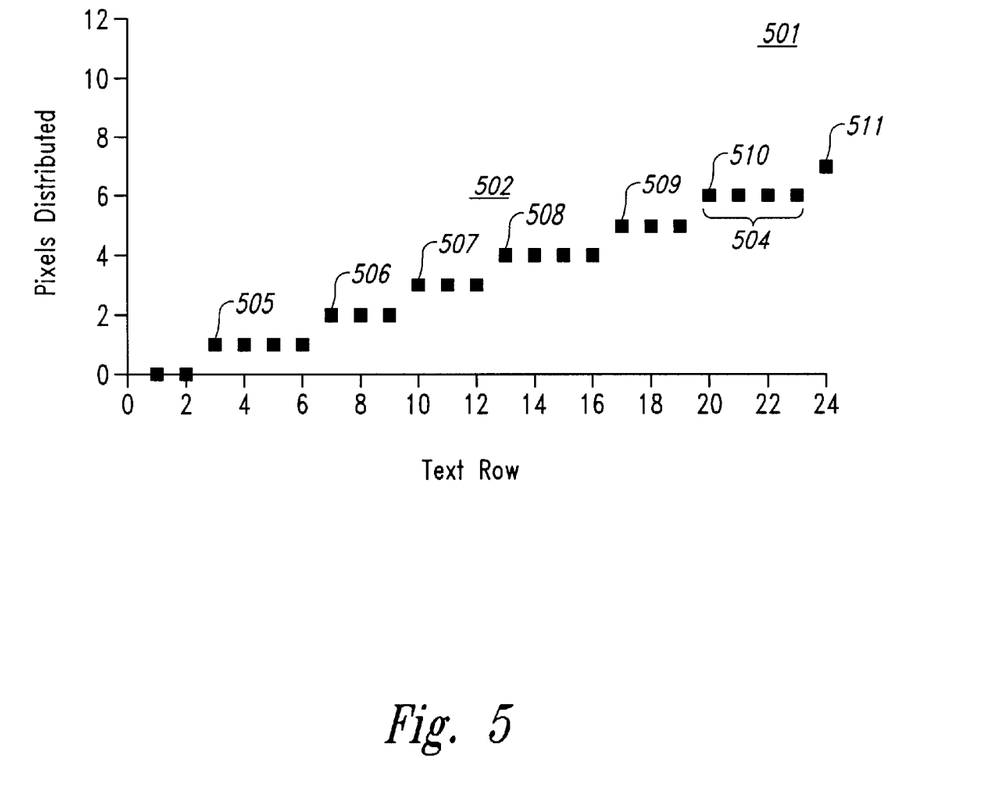
FIG. 5 is a diagram illustrating the results of the character spacing procedure performed by the Bresenham line drawing algorithm.

FIG. 5 provides a chart 501 illustrating the results of the character spacing procedure performed by the Bresenham line drawing algorithm of Table 1. As discussed above, the Bresenham line drawing algorithm distributes unused pixels in the graphics display window by modeling their distribution according to a raster line drawing operation. For character columns, the Bresenham algorithm operates on a line beginning at the first column of text and the left margin of the graphics display window, and ends at the last column of text and the right side of the graphics display window. For rows of text, the Bresenham algorithm distributes unused pixels along a model line beginning at the first text row and the bottom of the graphics display window and ending at the last text row and the top of the graphics display window.

The horizontal coordinate of each point of the model line at which the Bresenham algorithm increases the vertical coordinate corresponds to a row or column of text that is preceded by one additional pixel. For example, in a graphics display window having a height of 319 pixels into which the emulated session provides 24 text rows, the character spacing unit 301 will compute a synthesized height of:

synthesized height=319÷24=13

The synthesized height represents an integer calculation, discarding fractional results. The character spacing unit 301 will then calculate a margin height as:

margin height=319−(13×24)=7

The margin height provides an integer value for the unused area that will not be filled by the text rows.

The chart 501 illustrates the line drawn by the Bresenham algorithm according to the example provided above. The line 502 begins at the first row and the initial pixel distribution point (1, 0) and extends to the twenty-fourth column and the seventh distributed pixel (24, 7). As shown in FIG. 5, the line 502 indicates that extra pixels 505–511 will respectively precede rows 3, 7, 10, 13, 17, 20, and 24. The extra pixels 505–511 represent otherwise unused display space in the graphics display window. Thus, instead of distributing the 7 extra pixels above at one location, each of the seven pixels will be repositioned to the seven rows identified above. For example, the extra pixel 510 is shown as the first block in a new line segment 504 of the line 502. The pixel 510 is the first pixel of the 4 pixels in a line segment 504 of the line 502.

Figure 6:
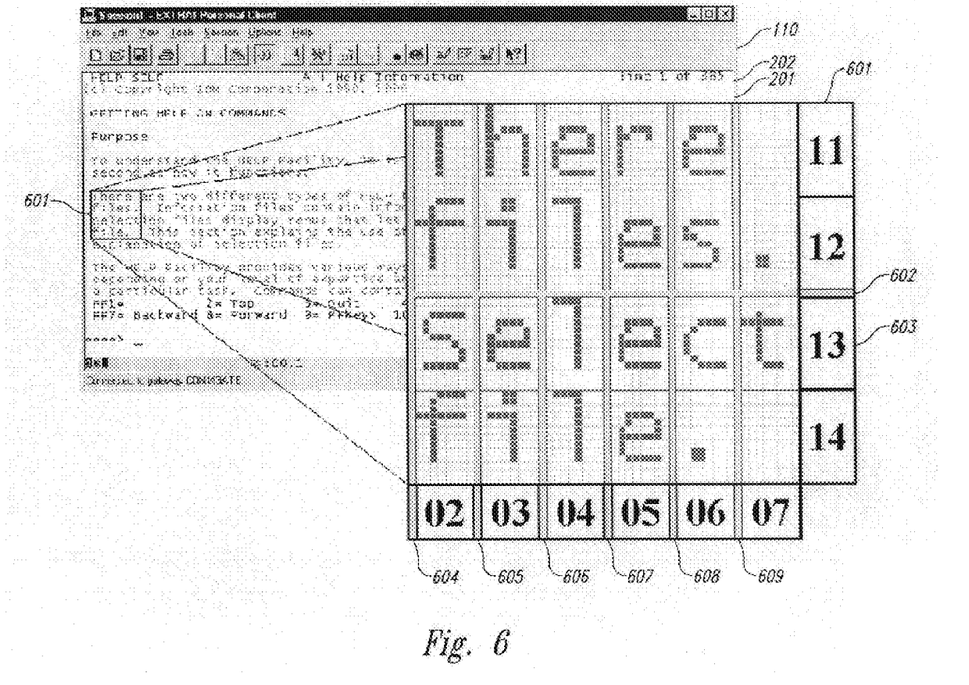
FIG. 6 illustrates the results of the Bresenham line drawing algorithm on a specific selection of text produced during an emulation session.

The results of the application by the character spacing unit 301 of the Bresenham line drawing algorithm for a specific selection of character text are illustrated in FIG. 6. The character spacing unit 301 has already applied the results of the Bresenham algorithm to the characters of the emulated session 201. Accordingly, the graphics border 202 of the graphic display window 110 aligns with the characters of the emulated session 201. A specific text block 601 from the emulated session 201 is shown magnified in FIG. 6.

The graphics border 202 shown in FIG. 6 has a window height of 319 pixels. The emulated session 201 contains 24 text rows. Accordingly, the character spacing unit 301 calculated the synthesized height as:

synthesized height=319÷24=13

The character spacing unit 301 calculated the margin height as:

margin height=319−(13×24)=7

The graphics border 202 has a window width of 719 pixels, and the emulated session 201 contains 80 text columns. Accordingly, the character spacing unit 301 calculated the synthesized width as:

synthesized width=719÷80=8

The character spacing unit 301 calculated the margin width as:

margin width=719−(8×80)=79

The calculations illustrated above are identical to the calculations performed with regard to the example illustrated in FIG. 5. As discussed with regard to the example of FIG. 5, an extra pixel precedes row 13. Similarly, as shown in FIG. 6, an extra pixel 602 precedes the text of a row 13, indicated by reference numeral 603 shown in the magnified text block 601. The extra pixel 602 is indicated in darker shading in the block 601.

The Bresenham algorithm is applied in both the horizontal and vertical directions, as previously discussed. Performance of the Bresenham algorithm with regard to the vertical spacing in the emulated session 201 results in the distribution of an extra pixel before all of the text columns in the graphics display window 110, with the exception of column 41. Accordingly, extra pixels 604–609 respectively precede text columns 1–7 shown in the magnified text block 601.

Figure 7A:
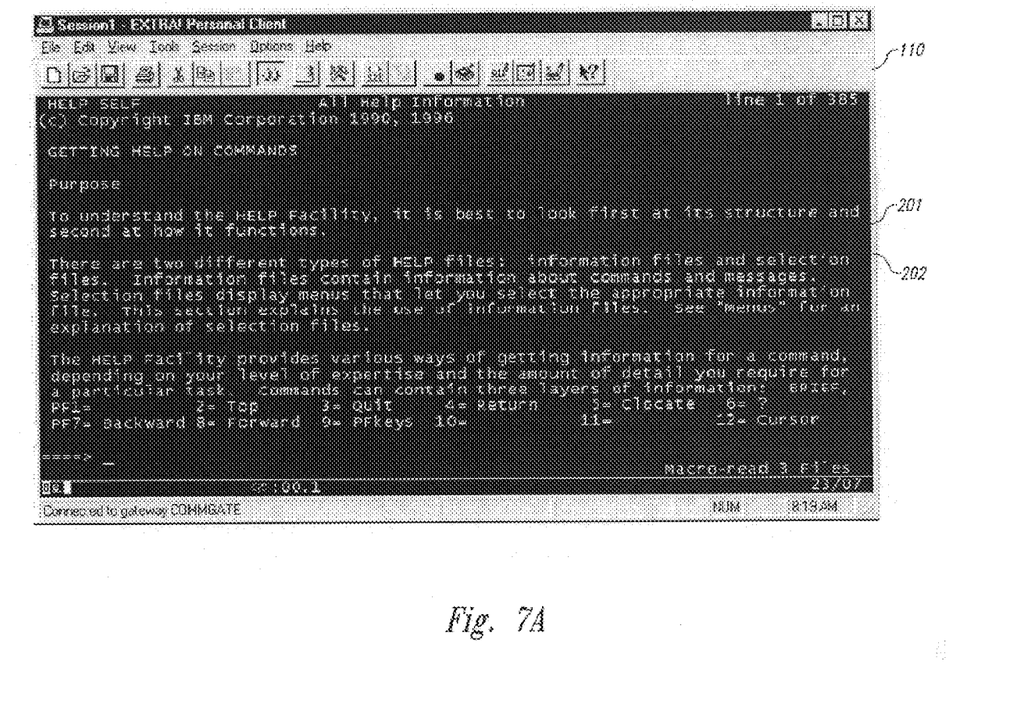
FIG. 7A illustrates a specific application of the present invention to the display of characters produced during a text-mode emulation session.

FIG. 7A illustrates a specific application of the present invention to the display of characters produced during an emulation session. The character spacing procedure of the present invention may be embodied in a character spacing unit provided in an emulation system. For example, the character spacing unit may be added to the Extra! Personal Client ("E!PC") produced by the Attachmate Corporation of Bellevue, Washington. One embodiment of E!PC, the E!PC 3270 Terminal Tool, emulates several different models of IBM 3270 graphics terminals. The most notable of the IBM 3270 graphics terminals are the 3179G or 3192G, which are 4:3 aspect ratio devices, and the 3472G, which is a 1:1 aspect ratio device. The aspect ratio is the horizontal-to-vertical ratio of pixels per unit of measure.

As previously discussed, IBM graphics terminals display text in fixed matrices of uniform columns and rows. The two standard matrices supported by the 3179G, 3192G and 3472G models are 80-by-24 (Model 2) and 80-by-32 (Model 3), with each matrix expressed as columns-by-rows. A character cell of fixed dimensions is located at each coordinate of the display. The following table shows standard character cell dimensions in pixels:

|  | Model 2 | Model 3 |
| --- | --- | --- |
| 3179G/3192G | 9-by-16 | 9-by-12 |
| 3472G | 9-by-21 | 9-by-16 |

The overall width of the terminal display is obtained by multiplying the character cell width by the number of columns. The overall height of the terminal display is obtained by multiplying the character cell height by the number of rows. The following table shows overall display dimensions for these graphics terminals in pixels:

|  | Model 2 | Model 3 |
|---|---|---|
| 3179G/3192G | 720-by-384 | 720-by-384 |
| 3472G | 720-by-504 | 720-by-512 |

Conceptually, a graphics terminal display may be divided into two layers: the text layer and the graphics layer. These two layers must have identical overall dimensions. Emulation of the supported IBM graphics terminals entails reporting physical characteristics to host applications as each actual device would and reconciling differences between these reported characteristics and the actual physical characteristics of the graphics display subsystem.

As discussed above, conventional emulation methods entailed reporting the actual physical characteristics of the emulator's display in the hope that the mainframe computer's graphics applications recognize these non-standard characteristics and adjust their behavior accordingly.

In contrast, the E!PC 3270 Terminal Tool having the character spacing unit 301 of the present invention reports the characteristics of the graphics terminal it is emulating and scales image information to match the physical characteristics. The E!PC 3270 Terminal Tool controls the overall dimensions of the graphics layer to ensure that the width-to-height ratio is correct. The character spacing unit 301 produces a text layer of the same overall dimensions by varying the spacing of the columns and rows of text to match the dimensions of the graphics layer exactly, as described above.

Figure 7B:
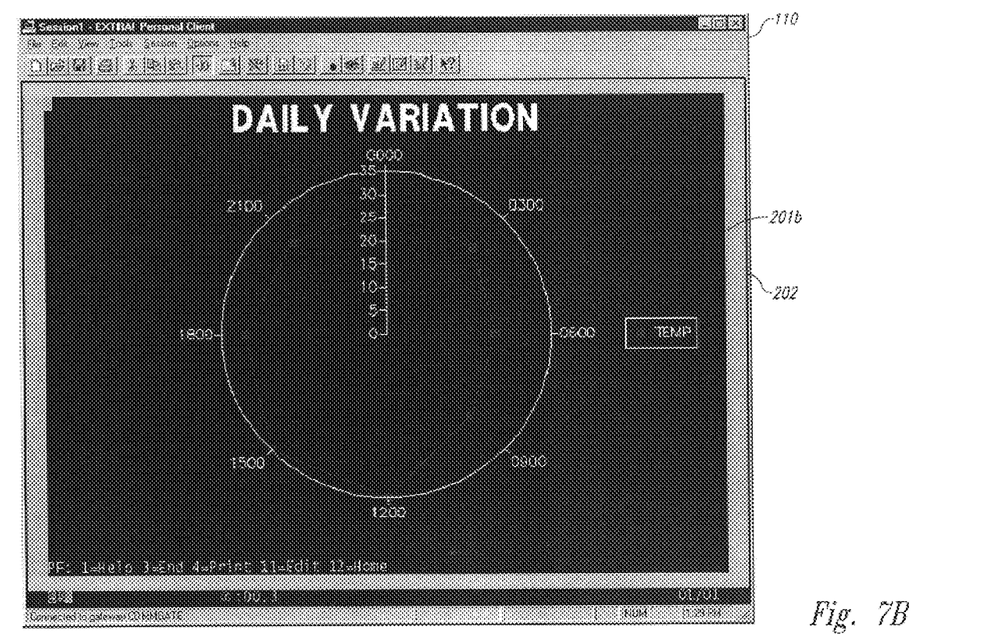
FIG. 7B illustrates a specific application of the present invention to a graphics-mode emulation display produced during a graphics-mode emulation session.

FIG. 7B illustrates the display of emulated graphics for an IBM 3179-G graphics terminal in a window produced for a personal computer. The IBM 3179-G graphics terminal employs a 4:3 aspect ratio display with a resolution of 720-by-384 pixels. The 3179-G supports two text display matrix configurations: Model 2 (80-by-24 using a fixed 9-by-16 pixel character cell); and Model 3 (80-by-32 using a fixed 9-by-12 pixel character cell). An IBM-compatible personal computer running Windows employs a 1:1 aspect ratio display with varying standard resolutions such as 640-by-480, 800-by-600, and 1024-by-768 pixels.

Using fixed character cells and converting dimensions to account for the difference in aspect ratios, a conventional emulator would utilize a 9-by-16 pixel character cell for the Model 3 configuration, yielding overall dimensions of 720-by-512 pixels. The Model 2 configuration would require a 27-by-64 pixel character cell, yielding overall dimensions of 2160-by-1536 pixels. The overall dimensions of the Model 2 configuration would be too large for most practical purposes.

By contrast, any emulation session whose graphics-layer dimensions are an integer multiple of 45-by-32 pixels will have the correct proportions. For example, graphics-layer dimensions of 450-by-320 pixels have the correct proportions. For the Model 2 configuration, the average character cell dimensions will be 5⅝-by-13⅓ pixels. For the Model 3 configuration, the average character cell dimensions will be 5⅝-by-10 pixels. These non-integer character cell dimensions cannot be achieved without varying character spacing.

FIG. 7B illustrates a specific application of the present invention to a graphics-mode emulation display produced during a graphics-mode emulation session. As previously discussed, without the character spacing unit 301 of the present invention, the emulated session 201b may not align with the graphics border 202. In contrast, the character spacing unit 301 of the present invention reports the characteristics of the graphics terminal it is emulating and scales the graphical image information to match the physical characteristics. The character spacing unit 301 controls the overall dimensions of the graphics layer to ensure that the width-to-height ratio is correct. Emulating the supported IBM graphics terminals, for example, entails reporting physical characteristics to host applications as each actual terminal device would and reconciling differences between these reported characteristics and the actual physical characteristics of the graphics display subsystem.

The behavior of the character spacing unit 301 in graphics mode as shown in FIG. 7B is very similar to the behavior of the character spacing unit 301 in text mode as shown in FIG. 7A. One difference between the two displays is that in text mode the character spacing unit 301 matches the text layer dimensions to those of the graphics border 202 in which the emulation session 201 is being drawn, whereas in graphics mode the character spacing unit 301 matches the text layer dimensions to those of the correctly-proportioned graphics layer. Thus, the character spacing unit 301 may not eliminate all the unused space between the emulated session 201b and the graphics border 202 in order to maintain a correctly-proportioned graphical image.

To further enhance the quality of the graphic display provided to the user, the character spacing unit 301 may also be employed in conjunction with an automatic window sizing unit that eliminates unused area within the graphics display window 110. The automatic window sizing unit may alter the dimensions of the graphics display window 110 to eliminate the unused space between the graphics border 202 and the emulation session 201b while still providing an accurate graphics display.

By the examples provided herein, an ordinarily skilled artisan will recognize that applying the character spacing method of the present invention to graphics device emulation provides a degree of flexibility which would otherwise be impossible.

While the present invention has been described with reference to a preferred embodiment thereof, those skilled in the art will appreciate that various changes in form and detail may be made without departing from the intended scope of the present invention as defined in the appended claims. For example, the emulation environment may differ from those discussed herein. The emulator's actual communications connections with a host computer may differ from the functional description given above. Moreover, various aspects of the invention may even be comprised of microcode provided in various pieces of hardware equipment, provided that the collective operation of the system functions in the general manner that has been described.

Although specific embodiments of, and examples for, the invention are described herein for illustrative purposes, various equivalent modifications are possible within the scope of the invention, as will be recognized by those skilled in the relevant art. The teachings provided herein of the invention can be applied to other legacy and enterprise computing systems, not just the exemplary host system described above. Various exemplary computing systems, and accordingly various other system configurations can be employed under other embodiments of the invention. The embodiments of the invention disclosed herein have been discussed with regard to computerized network installations, such as those using large centralized computing systems.

However, the invention finds equal applicability in other computing systems, such as small, portable computerized systems and even hand-held computing devices.

In general, in the following claims, the terms used should not be construed to limit the invention to the specific embodiments disclosed in the specification, but should be construed to include all terminal emulation and character spacing systems that operate in accordance with the claims. Accordingly, the invention is not limited by the disclosure, but instead its scope is determined by the following claims.

What is claimed is:

1. A method for minimizing an unused area in a graphics window generated by a client computer and distributing in the graphics window a plurality of characters comprising a text produced during an emulation session between the client computer and a host computer, comprising the steps of:

receiving the text containing the plurality of characters from the host computer;

determining dimensions of the graphics window;

using a font-sizing system on the client computer to scale each character of the plurality of characters in the text to each have a character cell to maximize a text area in the graphics window;

comparing the dimensions of the graphics window with dimensions of the plurality of characters having the character cell to determine dimensions associated with a first remaining unused area of the graphics window;

subsequent to using the font-sizing system, using a font synthesizing procedure to reduce the first remaining unused area to a second remaining unused area by adding one or more pixels to at least one of the character cells without being a portion of a character according to the dimensions associated with the first remaining unused area;

subsequent to using the font synthesizing procedure, using a linear distribution procedure to distribute one or more pixels between two or more of the character cells according to dimensions associated with the second remaining unused area; and centering the text area within the graphics window subsequent to using the linear distribution procedure.

2. The method of claim 1 wherein the characters of the plurality of characters are aligned in rows and columns, and wherein the linear distribution procedure positions at least one character of the plurality of characters outside at least one of a row and a column.

3. The method of claim 1 wherein the step of using the font synthesizing procedure comprises:

adding at least one pixel to at least one of a width and a height of the character cell without being a portion of a character for each character of the plurality of characters.

4. The method of claim 3 wherein the character cell has an associated base width and a base height, and wherein the step of adding at least one unused pixel to at least one of a width and a height of the character cell for each character of the plurality of characters, comprises:

calculating a width modifier for each character using a first formula:

the width modifier=(window width÷text columns)−base width; and calculating a height modifier for each character using a second formula:

the height modifier=(window height÷text rows)−base height, wherein calculations using the first formula and the second formula generate integer numbers, wherein the window width is a width dimension of the graphics window and the window height is a height dimension of the graphics window, and wherein the text columns are text columns of the text and the text rows are text rows of the text.

5. The method of claim 1 wherein using the font synthesizing procedure produces for the text a synthesized width and a synthesized height, and wherein the linear distribution procedure comprises:

calculating a margin width for the text using a first formula:

margin width=window width−(synthesized width×text columns); and calculating a margin height for the text using a second formula:

margin height=window height−(synthesized height×text rows), wherein calculations using the first formula and the second formula generate integer numbers, wherein the window width is a width dimension of the graphics window and the window height is a height dimension of the graphics window, and wherein the text columns are text columns of the text and the text rows are text rows of the text.

6. The method of claim 1 wherein the characters in the text are arranged in rows and columns, and wherein the linear distribution procedure produces a non-uniform distribution of the rows and columns.

7. The method of claim 1 wherein the linear distribution procedure uses a Bresenham raster graphics line drawing algorithm to distribute the one or more pixels between two or more of the character cells.

8. The method of claim 1 wherein the text containing the plurality of characters is formatted for transmission from the host computer to a terminal emulation device on the client computer and wherein the font-sizing system receives the text from the terminal emulation device.

9. The method of claim 1 wherein the font-sizing system is a TrueType font technology.

* * * * *